United States Patent [19]

Nilles et al.

[11] Patent Number: 5,349,342
[45] Date of Patent: Sep. 20, 1994

[54] METHOD FOR RECLAIMING UNUSED SYSTEM RESOURCES

[75] Inventors: Robert B. Nilles, Algonquin; Craig J. Collins, Carpentersville; James J. Killigrew, Palantine; Michael D. Sasuta, Mundelein, all of Ill.

[73] Assignee: Motorola, Inc., Schaumburg, Ill.

[21] Appl. No.: 828,325

[22] Filed: Jan. 30, 1992

[51] Int. Cl.$^5$ .............................. H04Q 7/00
[52] U.S. Cl. .............................. 340/825.08; 455/33.1; 370/95.2; 340/825.06
[58] Field of Search ............ 340/825.06, 825.07, 340/825.08, 825.04, 825.03; 455/33.1, 33.2, 33.3, 33.4; 370/94.1, 95.1, 95.2, 95.3

[56] References Cited

U.S. PATENT DOCUMENTS

| | | | |
|---|---|---|---|
| 4,644,347 | 2/1987 | Lucas et al. | 340/825.04 |
| 4,918,598 | 4/1990 | Ashkin et al. | 340/826.03 |
| 4,940,974 | 7/1990 | Sojka | 340/825.08 |
| 4,941,084 | 7/1990 | Terada et al. | 340/825.07 |
| 4,995,095 | 2/1991 | Lohrbach et al. | 340/825.06 |

Primary Examiner—Donald J. Yusko
Assistant Examiner—Edward Merz
Attorney, Agent, or Firm—Timothy W. Markison

[57] ABSTRACT

In a network of communication systems, a communication resource allocator of any of the communication systems may reclaim system resources from inactive communication systems. This may be accomplished by having the communication resource allocator transmit at least one polling message to the communication unit to determine whether the communication unit is in need of the at least one system resource. If the communication unit does not respond to the polling message, the communication resource allocator determines whether the communication unit is inactive. If the communication unit is inactive, the communication resource allocator reclaims the at least one system resource from the communication unit.

8 Claims, 2 Drawing Sheets

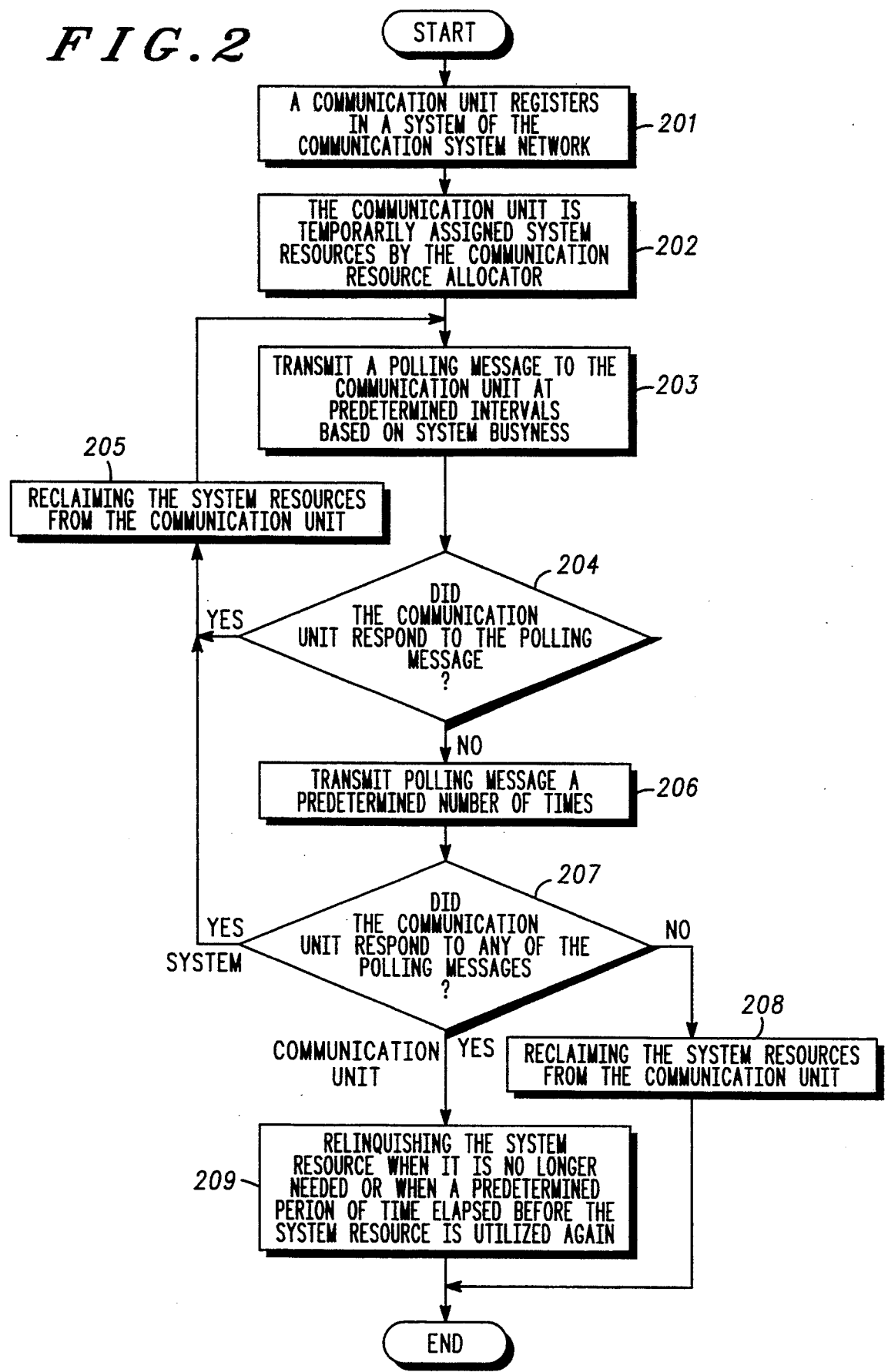

METHOD FOR RECLAIMING UNUSED SYSTEM RESOURCES

FIELD OF THE INVENTION

This invention relates generally to a network of communication systems and in particular to a method that allows a communication system to reclaim system resources from inactive communication units.

BACKGROUND OF THE INVENTION

Communication systems are known to comprise a plurality of communication units, a limited number of communication resources that are transceived via a predetermined number of repeaters, and a communication resource allocator that allocates the limited number of communication resources among the plurality of communication units. It is also known that communication units may roam from one communication system to another communication system and operate therein. When a communication unit roams into a new communication system, it transmits a registration packet to the communication resource allocator of the new system. Once the communication resource allocator processes the registration packet, it informs the communication unit whether it can register with the communication system or not. If the communication resource allocator allows the communication unit to register with the system, it allocates the communication unit at least one system resource. A system resource may be a temporary unit identification code, a talk group affiliation code, telephone access code or any other service that that communication system is capable of performing.

A difficulty arises when a communication unit that has been temporarily assigned system resources leaves the communication system. A communication unit may leave the communication system either by roaming out of range of the communication system or turning its power off. Under these conditions, the system resources that have been allocated to that communication unit remain assigned to that communication unit even though it is no longer active within the communication system. Thus, preventing other communication units from utilizing these system resources.

Therefore, a need exists for a method that will allow the communication resource allocator to reclaim system resources from inactive communication units.

SUMMARY OF THE INVENTION

This need and others are substantially met by the method for reclaiming unused system resources disclosed herein. In a network of communication systems each communication system includes a plurality of communication units, a limited number of communication resources that are transceived via a predetermined number of repeaters, and a communication resource allocator that allocates the limited number of communication resources among the plurality of communication units, wherein a communication unit of one communication system may function in any of the other communication systems in the network, and when a communication units registration request is granted, the communication resource allocator temporarily assigns the communication unit at least one system resource, a method for reclaiming the at least one system resource from an inactive communication unit can be achieved as follows.

The communication resource allocator transmits at least one polling message to the communication unit to determine whether the communication unit is in need of the at least one system resource. If the communication unit does not respond to the polling message, the communication resource allocator determines whether the communication unit is it active. If the communication unit is inactive, the communication resource allocator reclaims the at least one system resource from the communication unit.

BRIEF DESCRIPTION OF THE DRAWINGS

FIG. 2 illustrates a logic diagram of an implementation of the present invention.

DESCRIPTION OF A PREFERRED EMBODIMENT

Figure 1:
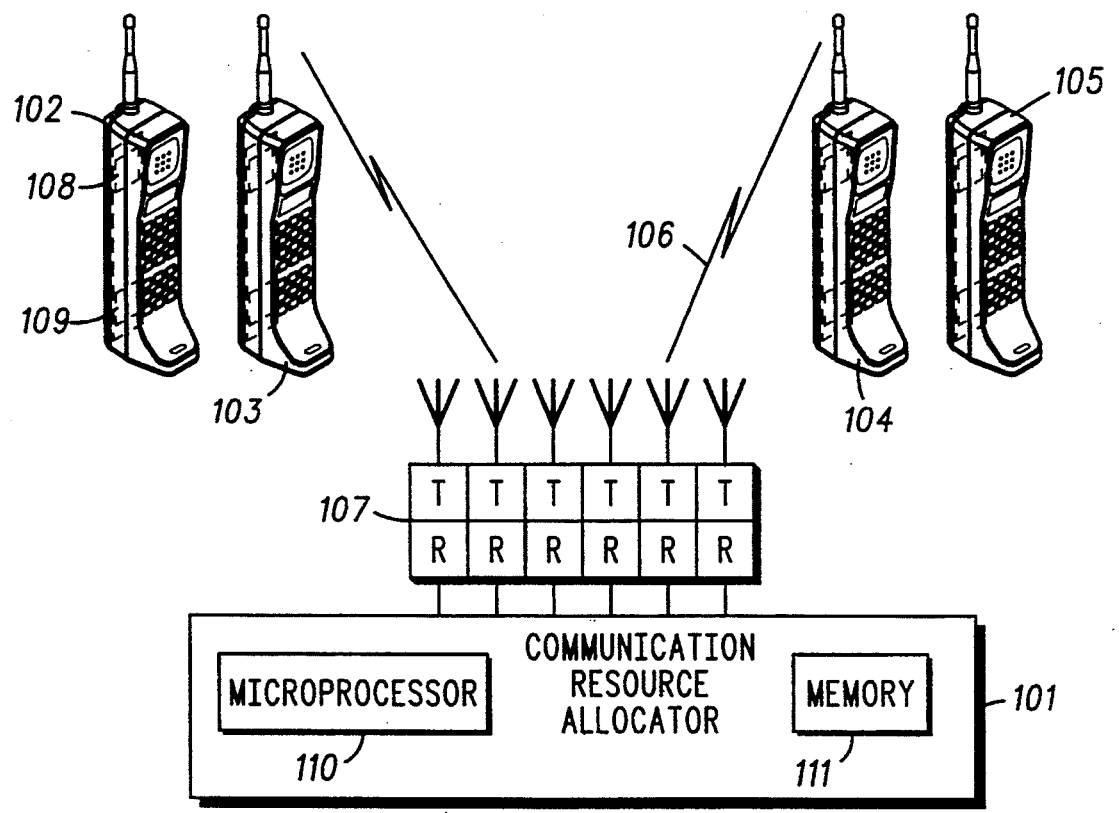
FIG. 1 illustrates a trunked communication system that may incorporate the present invention.

FIG. 1 illustrates a trunking communication system comprising a communication resource allocator 101, a plurality of communication units (four shown) 102–105, a limited number of communication resources 106, and a limited number of repeaters 107. Each of the communication units 102–105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102–105 and the communication resource allocator 101 via the repeaters 107, wherein the repeaters may comprise base stations. One of the communication resources 106 is selected as the control channel which transceives trunking communication system control data between the communication resource allocator and the communication units 102–105.

The communication system of FIG. 1 may be a part of a network of communication systems, wherein a communication unit of one communication system may operate in any other communication system of the network. This is generally accomplished by the communication resource allocator of each communication system being able to communicate to each other. The communication resource allocators may communicate via a hub computer network, or via a special control channel, both techniques are well known in the art. When a communication unit desires to operate in a different communication system other than its home communication system, it transmits an inbound signalling word (ISW) to the communication resource allocator of the non-home communication system. The communication resource allocator processes the ISW, as is known in the art, and allocates the communication unit system resources. System resources may comprise a temporary individual code for the communication unit, a temporary talk group assignment, access to phone lines, or other service that the particular communication unit subscribes to and the communication system can support. Having been allocated system resources, the communication unit may operate within this communication system as it would in its home communication system. When the communication unit becomes inactive, i.e. leaves this communication system or is powered down, the allocation of the system resources to the communication unit remains. The method of FIG. 2 allows a communication resource allocator to reclaim system resources from an inactive communication unit.

At step 201 of FIG. 2, a communication unit transmits a registration request to a communication system of the network. As discussed above, registration with a system comprises transmitting an ISW to the communication resource allocator of that system. Once the communication resource allocator has received the registration request, and determines that it is a valid request, it temporarily assigns system resources to the requesting communication unit 202. The communication resource allocator determines whether the request is valid based on, at least, whether the requesting communication unit has roaming capabilities, i.e. able to operate in different communication systems other than its home communication system. Verification of a registration request and communication unit roaming are known in the art and will not be discussed further. After allocating system resources to the communication unit, the communication resource allocator, at predetermined intervals based on system busyness, transmits a polling message to the communication unit 203. When the communication system is very busy, i.e. most of the system resources have been allocated to communication units, the communication resource allocator will transmit the polling message at a higher interval rate (for example, once every 10 seconds) than it would if the system were less busy (for example, once every 5 minutes). The communication resource allocator may also vary the transmission rate to a particular communication unit based upon the communication unit's position within the coverage area of the communication system. For example, as the communication unit approaches the fringes of the coverage area, the communication resource allocator will transmit the polling message at a higher rate than it would if the communication unit was well within the coverage area.

After transmitting the polling message, the communication resource allocator determines whether the communication unit responds to the polling message 204. If the communication unit affirmatively responded to the polling message, the communication resource allocator maintains the assignment of system resources to that communication unit 205. The communication unit may respond to the polling message directly by transmitting a response signal or indirectly by using the system resource. If the communication unit responds by using the system resource or whenever the communication unit uses the system resource, the communication resource allocator may omit transmitting the polling message to that communication unit for the next predetermined time interval. If the system resource assignment remains 205, the communication resource allocator, at the next predetermined interval, transmits a polling message and repeats steps 203 through 205. If the communication unit did not respond to the polling message 204, the communication resource allocator may transmit a predetermined number of polling messages to the communication unit 206. The communication resource allocator may transmit up to 20 polling messages before reclaiming the system resources. The number of retransmissions may vary depending on system busyness. For example, as the system busyness increases, the less the communication resource allocator will transmit the polling message such that it can reclaim the system resources more quickly from inactive communication units.

If the communication unit responds to any of the polling messages 207, the communication resource allocator maintains the system resource assignment 205 and the process repeats at step 203. If the communication unit does not respond to any of the polling messages 207, the communication resource allocator reclaims the system resources from the inactive communication unit 208. Once it reclaims the system resources from the communication unit, the process ends with respect to that particular communication unit. In addition to reclaiming the system resources from inactive communication units, the communication unit may transmit a relinquishing message to the communication resource allocator when the communication unit no longer needs the system resources 209. Having done this, the process ends for that particular communication unit.

The above describes a method that allows a communication resource allocator to more efficiently reclaim system resources from inactive communication units. The communication system is more efficient because it reclaims unused system resources more quickly than prior an systems, thus it can service more communication units.

We claim:

1. In a network of communication systems, wherein each communication system includes a plurality of communication units, a limited number of communication resources that are transceived via a predetermined number of repeaters, and a communication resource allocator that allocates the limited number of communication resources among the plurality of communication units, wherein a communication unit of one communication system functions in any of the other communication systems in the network, and when a communication unit's registration request is granted, the communication resource allocator temporarily assigns the communication unit at least one system resource, wherein the at least one system resource is either an identification code for the communication unit, a talk group or an access code that allows the communication unit to participate in services supported by any communication system in the network, a method for the communication resource allocator to reclaim the at least one system resource when the communication unit is inactive, the method comprises the steps of:

a) transmitting at least one polling message to the communication unit to determine whether the communication unit is no longer in need of the at least one system resource;

b) determining that the communication unit is inactive; and c) reclaiming the at least one system resource when the communication unit does not respond to the at least one polling message in a predetermined manner.

2. In the method of claim 1, step (b) further comprises transmitting multiple polling messages to the communication unit based upon a predetermined polling pattern.

3. In the method of claim 2, the predetermined polling pattern comprises varying an interval of time between transmissions of polling messages in a substantially inverse proportion to the number of system resources available.

4. In a network of communication systems, wherein each communication system includes a plurality of communication units, a limited number of communication resources that are transceived via a predetermined number of repeaters, and a communication resource allocator that allocates the limited number of communication resources among the plurality of communication units, wherein a communication unit of one communication system functions in any of the other communication systems in the network, and when a communication unit's registration request is granted, the communication resource allocator temporarily assigns the communication unit at least one system resource, wherein the at least one system resource is either an identification code for the communication unit, a talk group assignment, or an access code that allows the communication unit to participate in services supported by any communication system in the network, a method for a communication unit to relinquish the at least one system resource when the communication unit no longer needs the at least one system resource, the method comprises the steps of:

a) receiving a polling message that inquires whether the at least one system resource is still needed;

b) responding to the polling message; and c) relinquishing the at least one system resource in response to the polling message when the at least one system resource is no longer needed.

5. The method of claim 4 further comprises determining, after a predetermined period of time has elapsed, that the at least one system resource is no longer needed.

6. The method of claim 5 further comprises relinquishing the at least one system resource when the predetermined period of time has elapsed.

7. In the method of claim 4, step (b) further comprises responding to the polling message that the at least one system resource is still needed, either by transmitting a response signal to the communication resource controller or by utilizing the at least one system resource within a predetermined period of time.

8. In the method of claim 4, step (c) further comprises relinquishing the at least one system resource when another communication unit responds to the polling message.

* * * * *